United States Patent
Liu et al.

(10) Patent No.: US 10,742,072 B2
(45) Date of Patent: Aug. 11, 2020

(54) WIRELESS POWER TRANSMITTER CIRCUIT AND CONTROL CIRCUIT AND CONTROL METHOD THEREOF

(71) Applicant: RICHTEK TECHNOLOGY CORPORATION, Zhubei, Hsinchu (TW)

(72) Inventors: Kuo-Chi Liu, Hsinchu (TW); Ke-Horng Chen, New Taipei (TW)

(73) Assignee: RICHTEK TECHNOLOGY CORPORATION, Zhubei, Hsinchu (TW)

(*) Notice: Subject to any disclaimer, the term of this patent is extended or adjusted under 35 U.S.C. 154(b) by 151 days.

(21) Appl. No.: 15/984,291

(22) Filed: May 18, 2018

(65) Prior Publication Data
US 2018/0375380 A1   Dec. 27, 2018

Related U.S. Application Data

(60) Provisional application No. 62/522,937, filed on Jun. 21, 2017.

(30) Foreign Application Priority Data

Apr. 4, 2018   (CN) .......................... 2018 1 0300570

(51) Int. Cl.
*H02J 50/12*   (2016.01)
*H02M 1/088*   (2006.01)
(Continued)

(52) U.S. Cl.
CPC ............. *H02J 50/12* (2016.02); *H02M 1/088* (2013.01); *H02M 7/5387* (2013.01); *H02M 2001/0048* (2013.01)

(58) Field of Classification Search
CPC .. H02J 50/12; H02J 50/10; H02J 50/60; H02J 50/80; H02J 50/90; H02J 50/70;
(Continued)

(56) References Cited

U.S. PATENT DOCUMENTS

| | | | |
|---|---|---|---|
| 2011/0127843 A1* | 6/2011 | Karaoguz | H02J 7/025 307/104 |
| 2011/0127845 A1* | 6/2011 | Walley | H02J 50/40 307/104 |

(Continued)

*Primary Examiner* — Rexford N Barnie
*Assistant Examiner* — Jagdeep S Dhillon
(74) *Attorney, Agent, or Firm* — Tung & Associates (57) ABSTRACT

A wireless power transmitter circuit includes a power converter circuit, a power inverter circuit, an LC circuit, a resonant transmitter circuit, and a control circuit. The LC circuit includes an inductor and a capacitor, wherein an reactance of the LC circuit is substantially zero. The LC circuit is for converting the AC output current to a coil current. The resonant transmitter circuit includes at least one transmitter coil and a variable capacitor circuit, wherein the coil current flows through the at least one transmitter coil to generate a resonant wireless power. The control circuit generates a capacitance adjustment signal for adjusting an impedance of the variable capacitor circuit, such that the resonant transmitter circuit substantially operates in an impedance matched condition.

14 Claims, 6 Drawing Sheets

(51) Int. Cl.
*H02M 7/5387* (2007.01)
*H02M 1/00* (2006.01)
(58) Field of Classification Search
CPC .... H02J 50/40; H02J 7/00; H02J 7/025; H02J 5/005; H01F 38/14
USPC .................................. 307/104, 149, 9.1, 10.1
See application file for complete search history.

(56) References Cited

U.S. PATENT DOCUMENTS

| | | | | |
|---|---|---|---|---|
| 2011/0127951 A1* | 6/2011 | Walley | ................... | H02J 50/10 |
| | | | | 320/108 |
| 2011/0127954 A1* | 6/2011 | Walley | ................... | H02J 5/005 |
| | | | | 320/108 |
| 2015/0215006 A1* | 7/2015 | Mehas | ................ | H04B 5/0037 |
| | | | | 307/104 |
| 2016/0056664 A1* | 2/2016 | Partovi | ................ | B60L 53/126 |
| | | | | 307/104 |
| 2017/0368944 A1* | 12/2017 | Huang | ................... | H02J 50/12 |
| 2018/0062430 A1* | 3/2018 | Matsumoto | ....... | H02M 3/33592 |

\* cited by examiner

WIRELESS POWER TRANSMITTER CIRCUIT AND CONTROL CIRCUIT AND CONTROL METHOD THEREOF

CROSS REFERENCE

The present invention claims priority to U.S. 62/522,937, filed on Jun. 21, 2017, and CN 201810300570.0, filed on Apr. 4, 2018.

BACKGROUND OF THE INVENTION

Field of Invention

The present invention relates to a wireless power transmitter circuit, particularly, it relates to such wireless power transmitter circuit wherein a resonant transmitter circuit substantially operates in an impedance matched condition. The present invention also relates to a control method of the wireless power transmitter circuit.

Description of Related Art

Figure 1:
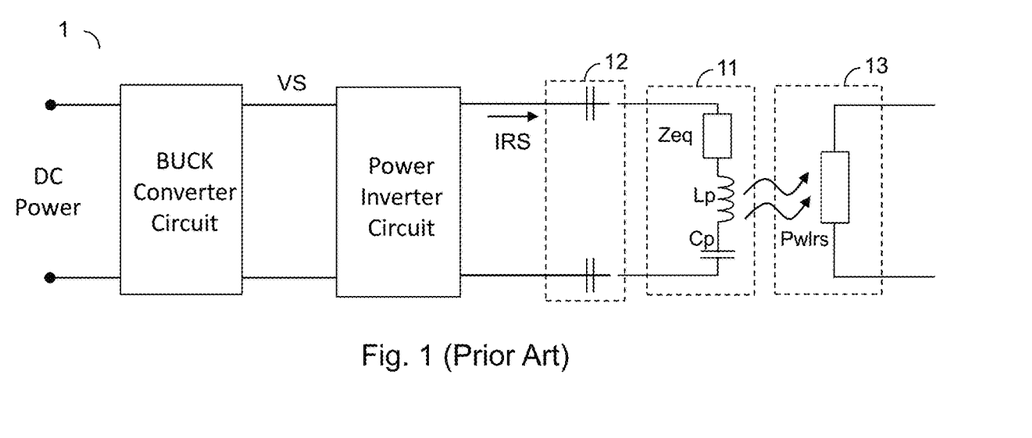
FIG. 1 shows a schematic diagram of a prior art wireless power transmitter circuit.

In general, a wireless power transmitter circuit is used in applications of wireless charging, and it is required for the wireless power transmitter circuit to be able to operate under constant current control in normal operation, and to be switchable to operating under constant power control when the input power or output power is overly high to avoid damage to the wireless power transmitter circuit itself or other circuits receiving power from it. FIG. 1 shows a prior art wireless power transmitter circuit (wireless power transmitter circuit 1) which comprises a buck converter circuit, a power inverter circuit, a resonant transmitter circuit 11, and a resonant match circuit 12. A resonant current IRS is determined according to the level of the input voltage VS of the power inverter circuit. The wireless power transmitter circuit 1 generates a resonant wireless power Pwlrs, for supplying a charging power to a charger circuit 13.

The prior art circuit in FIG. 1 has drawbacks that it requires a relatively high level of input voltage, a relatively wide voltage control range, and a digital to analog converter (not shown, for controlling the buck converter circuit and the power inverter circuit) with relatively high resolution in order to meet the requirement for the resonant current IRS to be controlled at a constant current or for the resonant wireless power Pwlrs to be controlled at a constant power. The resonant transmitter circuit 11 includes an inductor Lp and a capacitor Cp, with a reflection impedance Zeq which is an equivalent impedance of the resonant transmitter circuit 11, wherein the reflection impedance changes according to the position where the rechargeable circuit 13 is placed.

Figure 2:
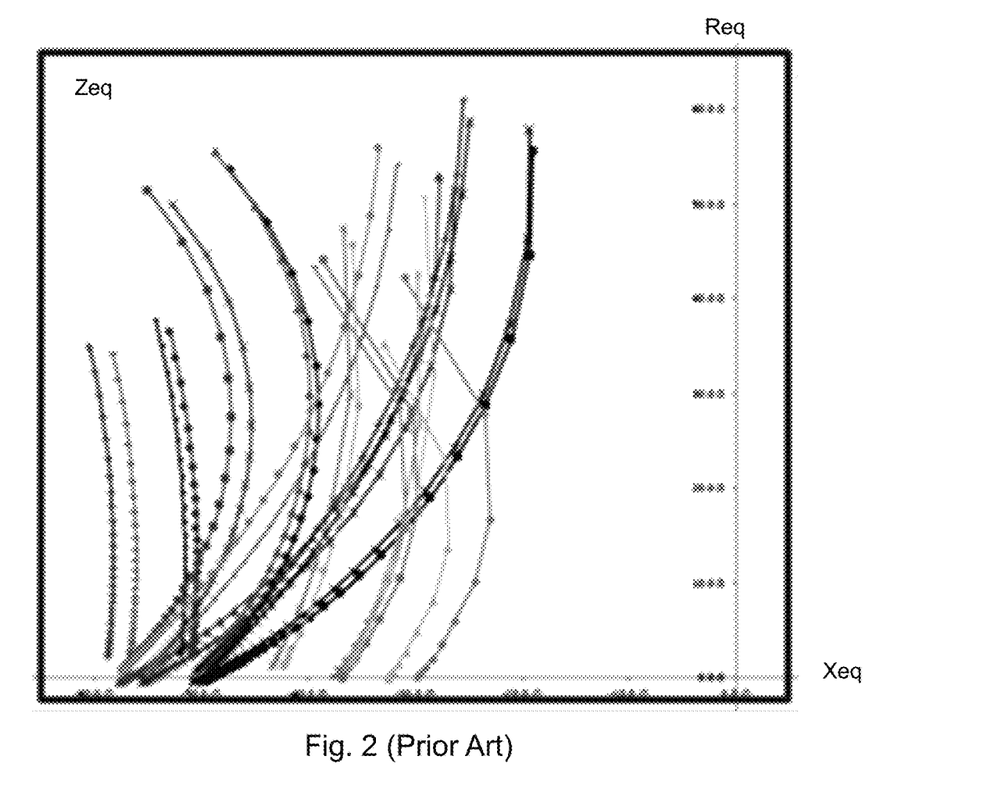
FIG. 2 shows that in the prior art, when a relative position between a rechargeable device and the resonant transmitter circuit 11 changes, the reflection impedance Zeq of the resonant transmitter circuit 11 will be different.
Figure 3:
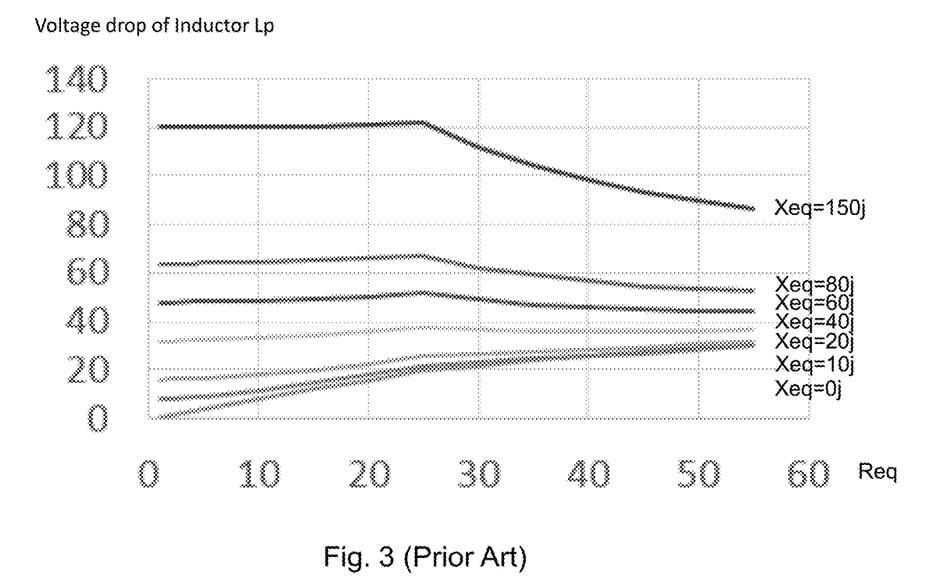
FIG. 3 shows that when the imaginary part of the reactance Xeq of the reflection impedance Zeq is higher, a higher voltage drop across the inductor Lp is required.

Another drawback of the prior art circuit in FIG. 1 is power loss. The resonant transmitter circuit 11 converts the AC output power to the resonant wireless power Pwlrs, and transmits wireless power to charge the rechargeable circuit 13 (such as a rechargeable battery or a cellular phone). In realistic applications, when the relative position between the rechargeable circuit 13 and the resonant transmitter circuit 11 changes, the reflection impedance Zeq of the resonant transmitter circuit 11 will be different, and the power loss increases thereby. As shown in FIG. 2, the reflection impedance Zeq includes a real part (a reflection resistance Req), and an imaginary part (a reactance Xeq). As shown in FIG. 2, when the position between a rechargeable device and the resonant transmitter circuit 11 changes, the reflection impedance Zeq of the resonant transmitter circuit 11 will be different. As the reactance Xeq becomes higher, the impedance mismatch condition of the resonant transmitter circuit 11 is more serious, and the power loss of the resonant wireless power Pwlrs is higher. If the constant current control and the constant power control are required, a higher voltage and a higher power are required. As shown in FIG. 3, when the imaginary part (the reactance Xeq) of the reflection impedance Zeq is higher, a higher voltage drop across the inductor Lp is required for achieving the same level of a coil current flowing through the inductor Lp.

In view of above, to overcome the drawbacks in the prior art, the present invention proposes a wireless power transmitter circuit and a control method thereof, to solve the aforementioned prior art problems, and to reduce power loss of the resonant wireless power circuit, whereby constant current control and constant power control can be achieved without extra power loss.

SUMMARY OF THE INVENTION

From one perspective, the present invention provides a wireless power transmitter circuit, comprising: a power converter circuit, which is configured to operably convert an input voltage to a conversion output voltage; a power inverter circuit, which is configured to operably switch at least one switch therein according to an operation signal, to convert the conversion output voltage to an AC output voltage, and to supply an AC output current, for generating an AC output power; an LC circuit, which includes an inductor and a capacitor, and is coupled to the power inverter circuit, wherein an reactance of the LC circuit is substantially zero, and the LC circuit is configured to operably convert the AC output current to a coil current; a resonant transmitter circuit, which includes at least one transmitter coil and a variable capacitor circuit, wherein the coil current flows through the at least one transmitter coil to generate a resonant wireless power; and a control circuit, configured to operably generate the operation signal and a capacitance adjustment signal, wherein the capacitance adjustment signal is for adjusting an impedance of the variable capacitor circuit, such that the resonant transmitter circuit substantially operates in an impedance matched condition.

In one preferable embodiment, the control circuit controls the power converter circuit, and/or adjusts the operation signal to control the power inverter circuit, such that when the AC output power is lower than a predetermined power, the coil current is maintained at a predetermined constant coil current, and when the AC output power is not lower than the predetermined power, the AC output power is maintained at the predetermined power.

In one preferable embodiment, the control circuit generates the capacitance adjustment signal according to the operation signal and/or the coil current, for adjusting the impedance of the variable capacitor circuit, such that the coil current is maintained at a first local minimum.

In one preferable embodiment, the control circuit generates the capacitance adjustment signal according to the AC output current, for adjusting the impedance of the variable capacitor circuit, such that the AC output current is maintained at a second local minimum.

In one preferable embodiment, the control circuit generates the capacitance adjustment signal according to a capacitor voltage of the capacitor in the LC circuit, for adjusting the impedance of the variable capacitor circuit, such that the capacitor voltage is maintained at a third local minimum.

In one preferable embodiment, the control circuit adjusts an operation frequency and/or a duty ratio of the operation signal, to control the power inverter circuit, such that when the AC output power is lower than the predetermined power, the coil current is maintained at the predetermined constant coil current, and when the AC output power is not lower than the predetermined power, the AC output power is maintained at the predetermined power.

In one preferable embodiment, the power inverter circuit is a half-bridge or a full-bridge class D inverter circuit, a class E inverter circuit, or a differential mode class E inverter circuit.

In one preferable embodiment, the power converter circuit is a buck converter circuit, a boost converter circuit, a buck-boost converter circuit, or an AC-DC converter circuit.

In one preferable embodiment, the inductor and the capacitor of the LC circuit and the transmitter coil form an LCL-resonant circuit.

From another perspective, the present invention provides a control method of a wireless power transmitter circuit, wherein the wireless power transmitter circuit is configured to operably transmit a resonant wireless power; the control method comprising: converting an input voltage to a conversion output voltage; switching at least one switch according to an operation signal, to convert the conversion output voltage to an AC output voltage, and to supply an AC output current, for generating an AC output power; providing an LC circuit, which includes an inductor and a capacitor, wherein an reactance of the LC circuit is substantially zero, and the LC circuit is configured to operably convert the AC output current to a coil current, so as to generate an LC power; converting the LC power to the resonant wireless power by the coil current flowing through at least one transmitter coil; and generating a capacitance adjustment signal for adjusting an impedance of a variable capacitor circuit, such that the resonant transmitter circuit substantially operates in an impedance matched condition.

In one preferable embodiment, when the AC output power is lower than a predetermined power, the conversion output voltage or the AC output voltage is adjusted, such that the coil current is maintained at a predetermined constant coil current, and when the AC output power is not lower than the predetermined power, the conversion output voltage or the AC output voltage is adjusted, such that the AC output power is maintained at the predetermined power.

In one preferable embodiment, the step of generating a capacitance adjustment signal for adjusting an impedance of a variable capacitor circuit, such that the resonant transmitter circuit substantially operates in an impedance matched condition, includes: generating the capacitance adjustment signal according to the operation signal and/or the coil current, for adjusting the impedance of the variable capacitor circuit, such that the coil current is maintained at a first local minimum.

In one preferable embodiment, the step of generating a capacitance adjustment signal for adjusting an impedance of a variable capacitor circuit, such that the resonant transmitter circuit substantially operates in an impedance matched condition, includes: generating the capacitance adjustment signal according to the AC output current, for adjusting the impedance of the variable capacitor circuit, such that the AC output current is maintained at a second local minimum.

In one preferable embodiment, the step of generating a capacitance adjustment signal for adjusting an impedance of a variable capacitor circuit, such that the resonant transmitter circuit substantially operates in an impedance matched condition, includes: generating the capacitance adjustment signal according to a capacitor voltage of the capacitor in the LC circuit, for adjusting the impedance of the variable capacitor circuit, such that the capacitor voltage is maintained at a third local minimum.

In one preferable embodiment, the control method of the wireless power transmitter circuit, further comprises: adjusting an operation frequency and/or a duty ratio of the operation signal, such that when the AC output power is lower than the predetermined power, the coil current is maintained at the predetermined constant coil current, and when the AC output power is not lower than the predetermined power, the AC output power is maintained at the predetermined power.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 4:
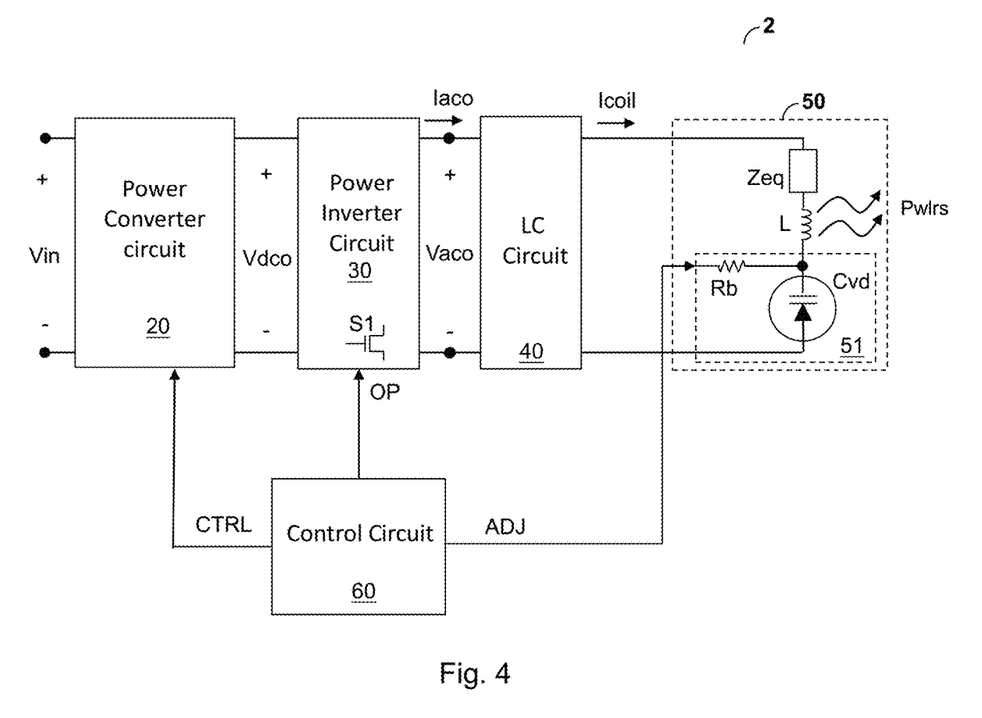
FIG. 4 shows a schematic diagram of an embodiment of a wireless power transmitter circuit according to the present invention.
Figure 5A:
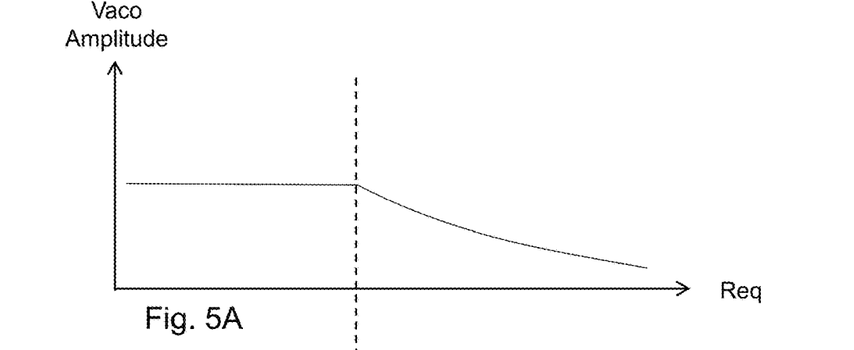
FIGS. 5A-5D show signal waveforms corresponding to the circuit shown in FIG. 4.
Figure 5B:
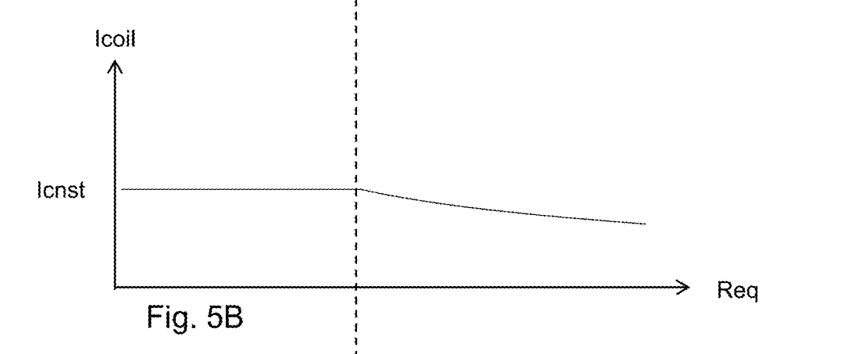
Figure 5C:
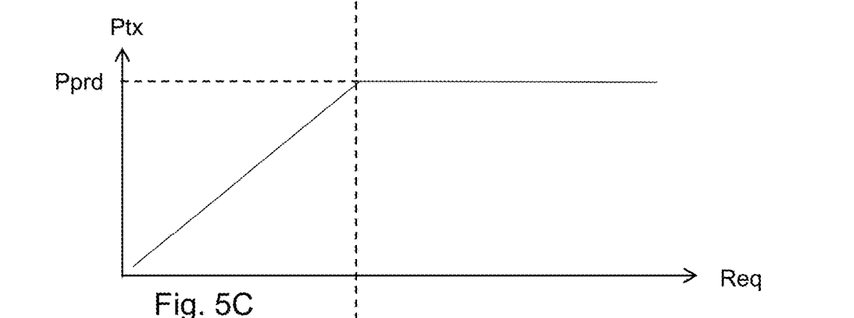
Figure 5D:
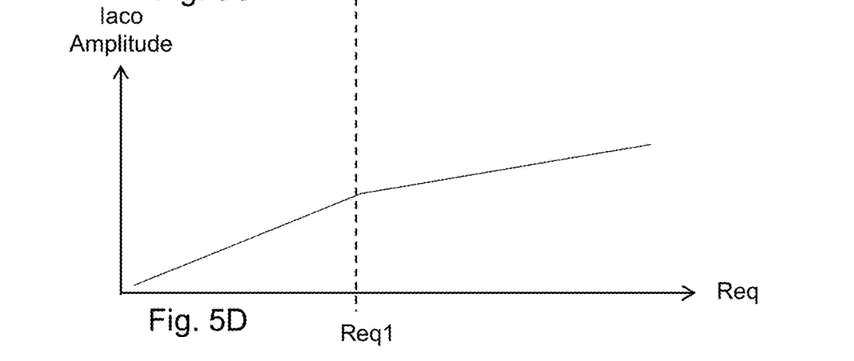

FIG. 4 shows a schematic diagram of one embodiment of the wireless power transmitter circuit according to the present invention (wireless power transmitter circuit 2), wherein the wireless power transmitter circuit 2 comprises a power converter circuit 20, a power inverter circuit 30, an LC circuit 40, a resonant transmitter circuit 50, and a control circuit 60. The power converter circuit 20 converts an input voltage Vin to a conversion output voltage Vdco. The output voltage Vin may be an AC voltage or a DC voltage, and the power converter circuit 20 can correspondingly be an AC-DC converter circuit or a DC-DC converter circuit. The power inverter circuit 30 switches at least one switch S1 therein according to an operation signal OP, to convert the conversion output voltage Vdco to an AC output voltage Vaco, and to supply an AC output current Iaco, for generating an AC output power Paco. The LC circuit 40 is coupled to the power inverter circuit 30. The LC circuit 40 includes at least one inductor and a capacitor (not shown, will be described in detail later). The LC circuit 40 has a reactance which is substantially zero. The LC circuit converts the AC output current Iaco to a coil current Icoil. The resonant transmitter circuit 50 includes at least one transmitter coil L and a variable capacitor circuit 51, wherein the coil current Icoil flows through the at least one transmitter coil L to generate a resonant wireless power Pwlrs. In this embodiment, the resonant transmitter circuit 50 includes the transmitter coil L and the variable capacitor circuit 51 connected in series, with a reflection impedance Zeq.

Note that, the resonant transmitter circuit 50 is not limited to a resonant circuit which includes an inductor and a capacitor connected in series as shown in this embodiment; the resonant transmitter circuit 50 may be embodied in others forms of the resonant circuit, such as a resonant circuit which includes an inductor and a capacitor connected in parallel, or a resonant circuit which includes an inductor/inductors and a capacitor/capacitors connected in a combination of series and parallel connections.

The control circuit 60 generates the operation signal OP and a capacitance adjustment signal ADJ, wherein the capacitance adjustment signal ADJ is for adjusting an impedance of the variable capacitor circuit 51, such that the resonant transmitter circuit 50 substantially operates in an impedance matched condition.

The "impedance matched condition" refers to a condition wherein the reflection impedance Zeq (including reflection resistance and reflection reactance) of the resonant transmitter circuit 50 is well adjusted, such that the AC output power Paco is substantially completely delivered to the transmitter coil L without any significant AC power reflected to the LC circuit 40, so that power conversion efficiency of the wireless power transmitter circuit 2 is optimized. The "impedance matched condition" is well known by those skilled in the art, so it is not redundantly explained in detail here.

Still referring to FIG. 4, in this embodiment, the variable capacitor circuit 51 includes a varactor Cvd, wherein the capacitance adjustment signal ADJ is an analog signal which is coupled to a control terminal of the varactor Cvd, for controlling the impedance of the varactor Cvd in an analog manner, such that the resonant transmitter circuit 50 substantially operates in the impedance matched condition. By "control the impedance of the varactor Cvd in an analog manner", it means that the impedance of the varactor is controllable to change continuously and non-stepwisely. That is, in the controllable range of the impedance of the varactor, the impedance of the varactor presents a continuous curve, not a step curve. On the contrary, to control the impedance of the varactor Cvd in a digital manner will be discontinuous, wherein the impedance of the varactor presents a step curve. The aforementioned varactor may be a voltage controlled varactor (for example a voltage controlled varactor diode), the capacitance of which is adjustable by applying different levels of reverse bias voltages. In this embodiment, the capacitance adjustment signal ADJ is coupled to the control terminal of the varactor CVD through a bias resistor Rb, while in another embodiment, the bias resistor Rb may be omitted.

Still referring to FIG. 4, and also referring to FIGS. 5A-5D, in one preferable embodiment, the control circuit 50 controls the power converter circuit 20, and/or adjusts the operation signal OP to control the power inverter circuit 30, such that when the AC output power Paco is lower than a predetermined power Pprd, the coil current Icoil is maintained at a predetermined constant coil current Icnst, and when the AC output power Paco is not lower than the predetermined power Pprd, the AC output power Paco is maintained at the predetermined power Pprd. The control circuit 50 can obtain information of the AC output power Paco according to a signal related to the AC output current Iaco and another signal related to the AC output voltage Vaco. A control signal CTRL controls the power conversion circuit 20, to regulate the AC output power Paco substantially at the predetermined power Pprd, such that the wireless power transmitter circuit 2 can operate in a constant power mode.

The aforementioned "predetermined" power Pprd may be a fixed value or an adjustable variable which is predefined. Also please note that: although it is the target for the AC output power Paco to be regulated at the predetermined power Pprd, however due to non-idealities of the circuitry caused by for example imperfection of components or imperfect matching among components, the level of the actual AC output power Paco may not be exactly equal to the predetermined power Pprd, but just close to the predetermined power Pprd, and therefore the term "substantially" at the predetermined power Pprd should be construed to mean a reasonable range around the predetermined power Pprd.

As shown in FIGS. 5A-5D, when the reflection resistance Req is equal to a resistance Req1, the AC output power Paco is the predetermined power Pprd. The amplitude of the AC output voltage Vaco is substantially proportional to the coil current Icoil. The AC output current Iaco increases as the reflection resistance Req increases.

In the wireless power transmitter circuit according to the present invention, the power conversion circuit 20 may be embodied in different types, such as: a buck converter circuit, a boost converter circuit, or a buck-boost converter circuit, according to a voltage range of the input voltage Vin, and a power range of the AC output power Paco. Or, the power conversion circuit 20 may be an AC-DC converter circuit to perform AC-DC conversion for an AC input voltage Vin.

In the wireless power transmitter circuit according to the present invention, the power inverter circuit 30 may be embodied in different types, such as: a half-bridge or a full-bridge class D inverter circuit, a class E inverter circuit, or a differential mode class E inverter circuit, according to application requirements.

Figure 6:
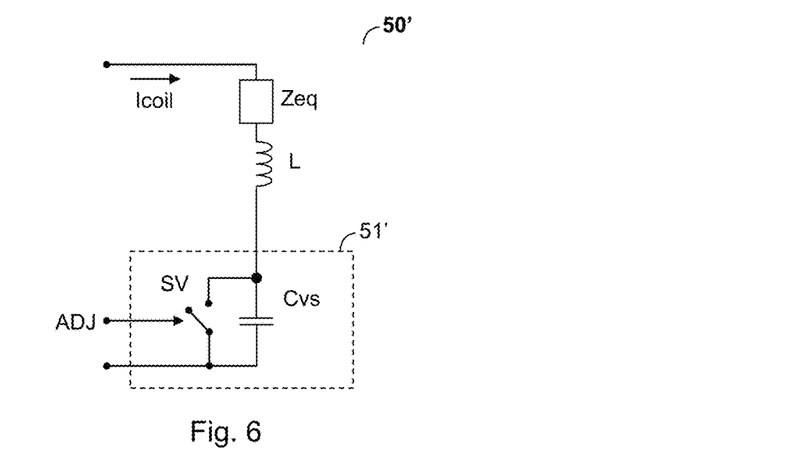
FIG. 6 shows a schematic diagram of an embodiment of a resonant transmitter circuit of the wireless power transmitter circuit according to the present invention.

Referring to FIG. 6, in one embodiment, the variable capacitor circuit 51' of the resonant transmitter circuit 50' (corresponding to the resonant transmitter circuit 50 shown in FIG. 4) includes a capacitor and a capacitor switch which are connected to each other (for example but not limited to the capacitor Cvs and the capacitor switch SV connected in parallel shown in FIG. 6). In this embodiment, the capacitance adjustment signal ADJ controls the switching of the capacitor switch SV so as to control the reflection impedance Zeq of the variable capacitor circuit 51' and the resonant transmitter circuit 50', whereby the resonant transmitter circuit 50' substantially operates in the impedance matched condition.

Figure 7:
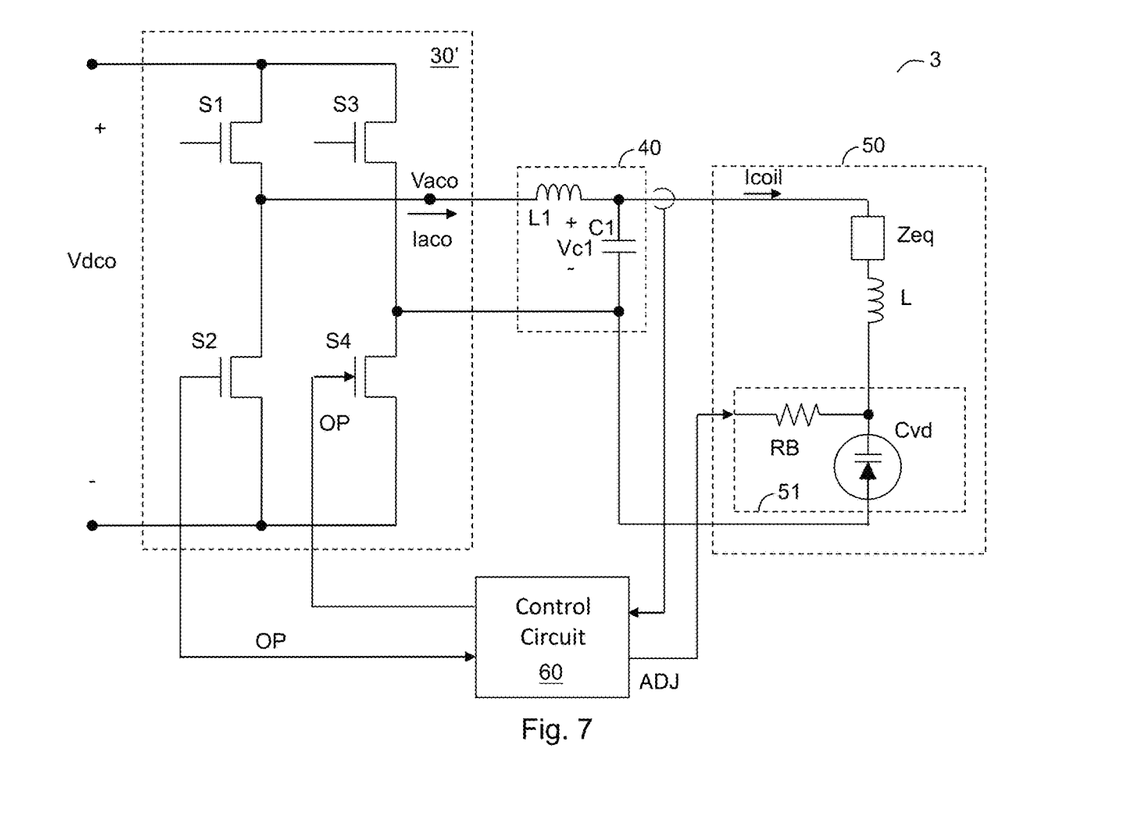
FIG. 7 shows a schematic diagram of another embodiment of the wireless power transmitter circuit according to the present invention.

FIG. 7 shows a schematic diagram of another embodiment of the wireless power transmitter circuit according to the present invention. Referring to FIG. 7, in one embodiment, the power inverter circuit of wireless power transmitter circuit 3 is a full-bridge class D inverter circuit (power inverter circuit 30'), which includes four switching devices (i.e. the switches S1, S2, S3 and S4 shown in the figure). These four switching devices switch according to the operation signal OP with an operating frequency (e.g. 6.78 MHz) to convert the output voltage Vdco to the AC output voltage Vaco. The LC circuit 40 includes an inductor L1 and a capacitor C1, wherein a voltage across the capacitor C1 (capacitor voltage) is Vc1. In one preferable embodiment, the inductor L1 and the capacitor C1 of the LC circuit 40 and the transmitter coil L form an LCL-resonant circuit, such that when the wireless power transmitter circuit 3 operates with a resonant frequency, the LCL-resonant circuit can be a stable current source which provide the coil current Icoil as a stable constant current. Similarly, the control circuit 60 generates the capacitance adjustment signal ADJ according to the operation signal OP and/or the coil current Icoil, for controlling the impedance of the variable capacitor circuit 51 to adjust the reflection impedance Zeq of the variable capacitor circuit 51 and the resonant transmitter circuit 50, such that the coil current Icoil is maintained at a first local minimum, and the resonant transmitter circuit 50 substantially operates in the impedance matched condition, wherein the control circuit 60 may generate the capacitance adjustment signal ADJ according to a frequency, a phase, and/or a duty ratio of the operation signal. The operation mechanism is similar to the embodiment shown in FIG. 4 and is not redundantly repeated herein.

Besides, in one embodiment, the power inverter circuit of the wireless power transmitter circuit of the present invention may be a selectable power inverter circuit. As an example, referring to FIG. 7, in one embodiment, in relatively lower power applications, the switches S3 and S4 of power inverter circuit 30' are controlled to be constantly non-conductive and conductive respectively (i.e. only the switches S1 and S2 keep switching with the operating frequency), such that the power inverter circuit 30' operates as a half-bridge class D inverter circuit, to reduce power consumption.

Figure 8:
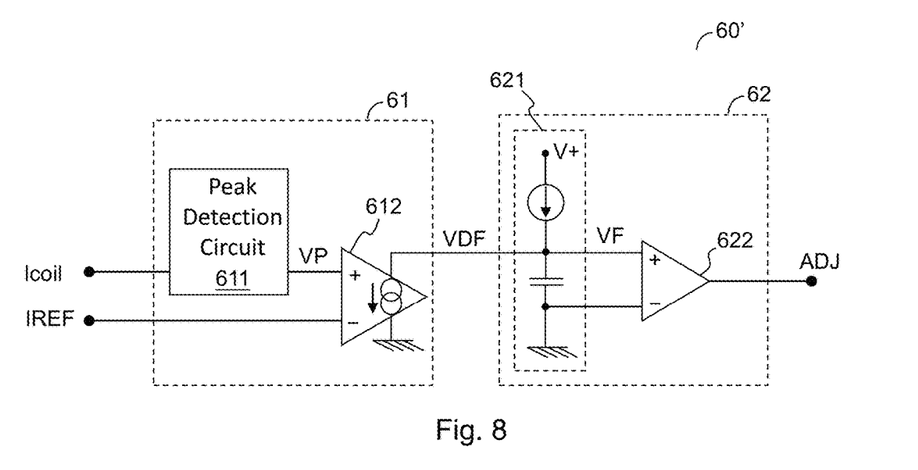
FIG. 8 shows a schematic diagram of an embodiment of a control circuit of the wireless power transmitter circuit according to the present invention.

Referring to FIG. 8, in one embodiment, the control circuit 60' (corresponding to for example the control circuit 60 shown in FIG. 4) includes a current signal processing circuit 61 and a signal conversion circuit 62. The current signal processing circuit 61 generates a difference signal VDF according to a current reference signal IREF and the coil current Icoil. The signal conversion circuit 62 generates the capacitance adjustment signal ADJ according to the difference signal VDF, for controlling the impedance of the variable capacitor circuit 51, such that the resonant transmitter circuit 50 substantially operates in the impedance matched condition. The details of the current signal processing circuit 61 and the signal conversion circuit 62 will be described below.

Still referring to FIG. 8, in one embodiment, the current signal processing circuit 61 includes a peak detection circuit 611 and a transconductance amplifier circuit 612. The peak detection circuit 611 generates a peak current signal VP according to a peak value of the coil current Icoil. The transconductance amplifier circuit 612 generates the difference signal VDF according to the peak current signal VP and the reference current signal IREF. The signal conversion circuit 62 includes an integration filter circuit 621 and a buffer amplifier circuit 622. The integration filter circuit 621 generates a filtered current signal VF by integrating and filtering the difference signal VDF. The buffer amplifier circuit 622 generates the capacitance adjustment signal ADJ by buffering and amplifying the filtered current signal VF. In this embodiment, the capacitance adjustment signal ADJ may be an impedance control bias voltage for controlling the control terminal of the varactor Cvd to control the impedance of the varactor Cvd in an analog manner, so as to control the impedance of the variable circuit 51 such that the resonant transmitter circuit 50 substantially operates in the impedance matched condition.

Figure 9:
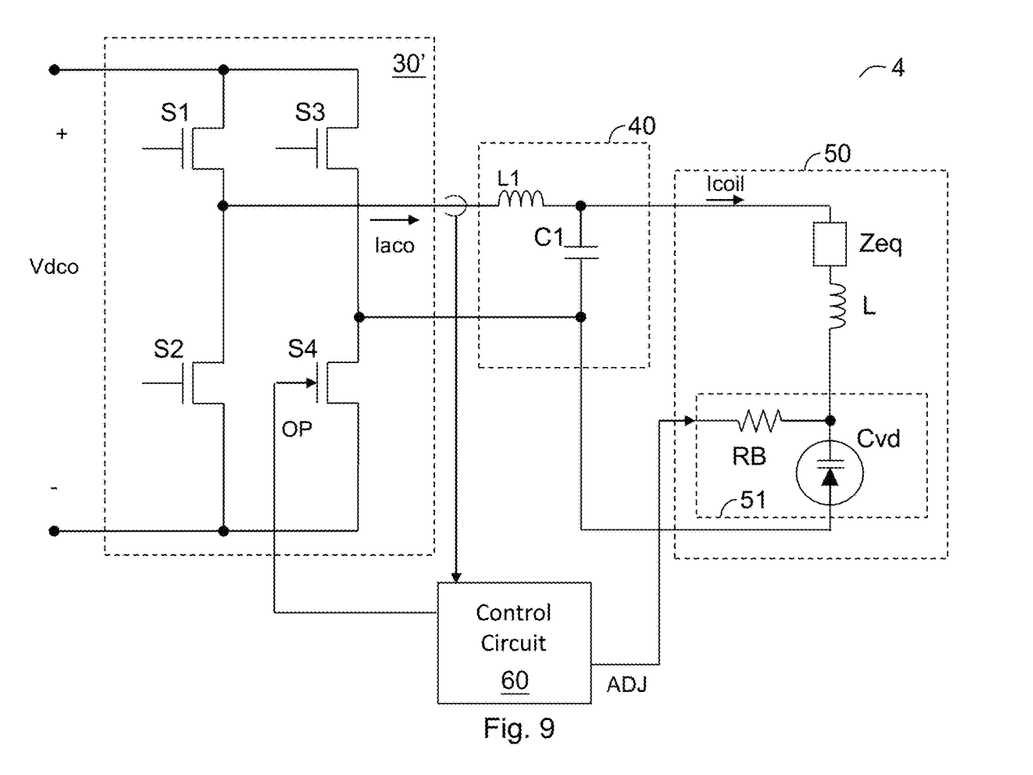
FIG. 9 shows a schematic diagram of another embodiment of the wireless power transmitter circuit according to the present invention.

FIG. 9 shows a schematic diagram of another embodiment of the wireless power transmitter circuit according to the present invention. Referring to FIG. 9, in one embodiment, the power inverter circuit of wireless power transmitter circuit 4 is a full-bridge class D inverter circuit (power inverter circuit 30'), which includes four switching devices (i.e. the switches S1, S2, S3 and S4 shown in the figure). These four switching devices switch according to the operation signal OP with an operating frequency (e.g. 6.78 MHz) to convert the output voltage Vdco to the AC output voltage Vaco. Similarly, the control circuit 60 generates the capacitance adjustment signal ADJ according to the AC output current Iaco, for controlling the impedance of the variable capacitor circuit 51 to adjust the reflection impedance Zeq of the variable capacitor circuit 51 and the resonant transmitter circuit 50, such that the AC output current Iaco is maintained at a second local minimum, and the resonant transmitter circuit 50 substantially operates in the impedance matched condition. The operation mechanism is similar to the embodiment shown in FIG. 4 and is not redundantly repeated herein.

Figure 10:
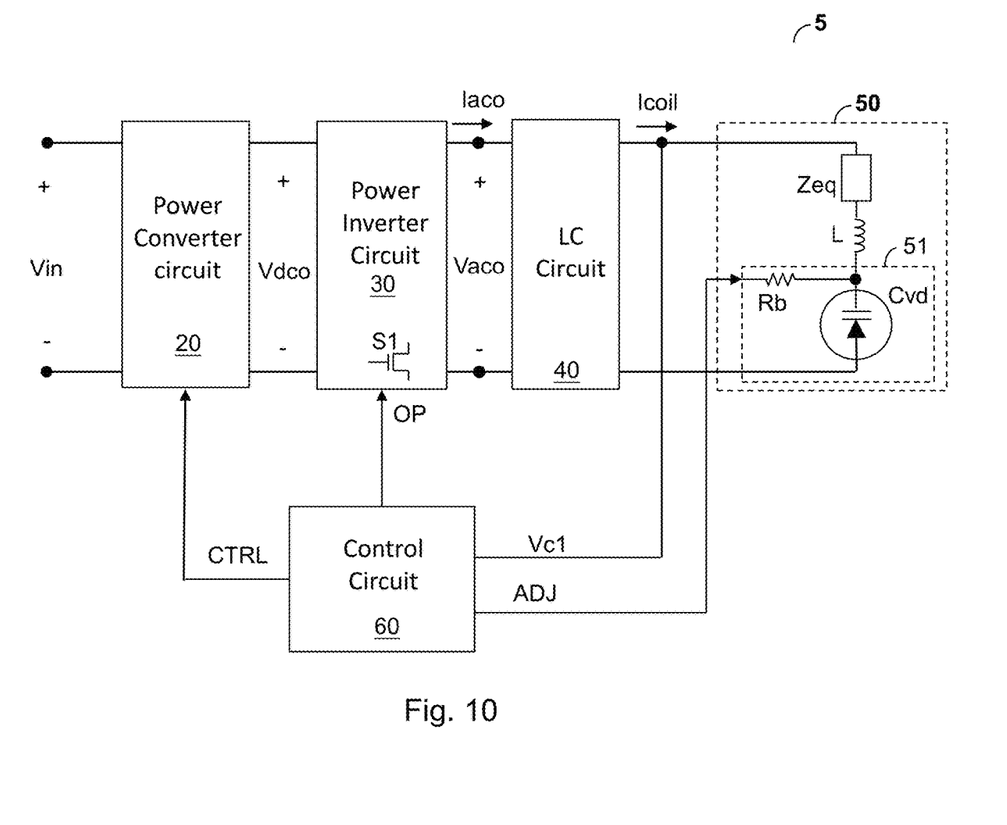
FIG. 10 shows a schematic diagram of another embodiment of the wireless power transmitter circuit according to the present invention.

FIG. 10 shows a schematic diagram of another embodiment of the wireless power transmitter circuit (a wireless power transmitter circuits) according to the present invention. Similarly, the control circuit 60 generates the capacitance adjustment signal ADJ according to the capacitor voltage Vc1, which is the voltage across the capacitor in the LC circuit 40, for controlling the impedance of the variable capacitor circuit 51 to adjust the reflection impedance Zeq of the variable capacitor circuit 51 and the resonant transmitter circuit 50, such that the capacitor voltage Vc1 across the capacitor in the LC circuit 40 is maintained at a third local minimum, and the resonant transmitter circuit 50 substantially operates in the impedance matched condition. The operation mechanism is similar to the embodiment shown in FIG. 4 and is not redundantly repeated herein.

Note that, the aforementioned "the capacitor voltage Vc1 of the capacitor in the LC circuit 40 is maintained at a third local minimum" indicates that the capacitance adjustment signal ADJ controls the impedance of the variable capacitor circuit 51 to adjust the reflection impedance Zeq of the variable capacitor circuit 51 and the resonant transmitter circuit 50, such that the capacitor voltage Vc1 is maintained at a mathematically local minimum (the third local minimum). The local minimum is a mathematical term which is well known by those skilled in the art, so it is not explained in detail here, and so are the first local minimum and the second local minimum.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. As an example, the "constant current mode" and the "constant power mode" can be used together, such that the wireless power transmitter circuit can have the advantages of these two types operation modes. As another example, the "boost conversion circuit" and the "half-bridge class D inverter circuit", "full-bridge class D inverter circuit", or "class E inverter circuit" can be used together, such that the wireless power transmitter circuit can meet different requirements with different combinations. The wireless power transmitter circuit may include combinations of circuits of two or more of the aforementioned embodiments. Furthermore, those skilled in this art can readily conceive variations and modifications within the spirit of the present invention. For example, in the aforementioned embodiment shown in FIG. 8, though current mode circuits (for example but not limited to the transconductance amplifier circuit 612) are used to illustrate the embodiment, voltage mode circuits can alternatively be used for realizing the same functions according to the spirit of the present invention. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:
1. A wireless power transmitter circuit, comprising:
a power converter circuit, which is configured to operably convert an input voltage to a conversion output voltage;
a power inverter circuit, which is configured to operably switch at least one switch therein according to an operation signal, to convert the conversion output voltage to an AC output voltage, and to supply an AC output current, for generating an AC output power;
an LC circuit, which includes an inductor and a capacitor, and is coupled to the power inverter circuit, wherein an reactance of the LC circuit is substantially zero, and the LC circuit is configured to operably convert the AC output current to a coil current;
a resonant transmitter circuit, which includes at least one transmitter coil and a variable capacitor circuit, wherein the coil current flows through the at least one transmitter coil to generate a resonant wireless power; and
a control circuit, configured to operably generate the operation signal and a capacitance adjustment signal, wherein the capacitance adjustment signal is for adjusting an impedance of the variable capacitor circuit, such that the resonant transmitter circuit substantially operates in an impedance matched condition;
wherein the inductor and the capacitor of the LC circuit and the transmitter coil form an LCL-resonant circuit, such that when the wireless power transmitter circuit operates with a resonant frequency, the LCL-resonant circuit provides and stabilizes the coil current.

2. The wireless power transmitter circuit of claim 1, wherein the control circuit controls the power converter circuit, and/or adjusts the operation signal to control the power inverter circuit, such that when the AC output power is lower than a predetermined power, the coil current is maintained at a predetermined constant coil current, and when the AC output power is not lower than the predetermined power, the AC output power is maintained at the predetermined power.

3. The wireless power transmitter circuit of claim 1, wherein the control circuit generates the capacitance adjustment signal according to the operation signal and/or the coil current, for adjusting the impedance of the variable capacitor circuit, such that the coil current is maintained at a first local minimum.

4. The wireless power transmitter circuit of claim 1, wherein the control circuit generates the capacitance adjustment signal according to the AC output current, for adjusting the impedance of the variable capacitor circuit, such that the AC output current is maintained at a second local minimum.

5. The wireless power transmitter circuit of claim 1, wherein the control circuit generates the capacitance adjustment signal according to a capacitor voltage of the capacitor in the LC circuit, for adjusting the impedance of the variable capacitor circuit, such that the capacitor voltage is maintained at a third local minimum.

6. The wireless power transmitter circuit of claim 2, wherein the control circuit adjusts an operation frequency and/or a duty ratio of the operation signal, to control the power inverter circuit, such that when the AC output power is lower than the predetermined power, the coil current is maintained at the predetermined constant coil current, and when the AC output power is not lower than the predetermined power, the AC output power is maintained at the predetermined power.

7. The wireless power transmitter circuit of claim 1, wherein the power inverter circuit is a half-bridge or a full-bridge class D inverter circuit, a class E inverter circuit, or a differential mode class E inverter circuit.

8. The wireless power transmitter circuit of claim 1, wherein the power converter circuit is a buck converter circuit, a boost converter circuit, a buck-boost converter circuit, or an AC-DC converter circuit.

9. A control method of a wireless power transmitter circuit, wherein the wireless power transmitter circuit is configured to operably transmit a resonant wireless power; the control method comprising:
converting an input voltage to a conversion output voltage;
switching at least one switch according to an operation signal, to convert the conversion output voltage to an AC output voltage, and to supply an AC output current, for generating an AC output power;
providing an LC circuit, which includes an inductor and a capacitor, wherein an reactance of the LC circuit is substantially zero, and the LC circuit is configured to operably convert the AC output current to a coil current, so as to generate an LC power;
converting the LC power to the resonant wireless power by the coil current flowing through at least one transmitter coil; and
generating a capacitance adjustment signal for adjusting an impedance of a variable capacitor circuit, such that the resonant transmitter circuit substantially operates in an impedance matched condition;
wherein the inductor and the capacitor of the LC circuit and the transmitter coil form an LCL-resonant circuit, such that when the wireless power transmitter circuit operates with a resonant frequency, the LCL-resonant circuit provides and stabilizes the coil current.

10. The control method of claim 9, wherein when the AC output power is lower than a predetermined power, the conversion output voltage or the AC output voltage is adjusted, such that the coil current is maintained at a predetermined constant coil current, and when the AC output power is not lower than the predetermined power, the conversion output voltage or the AC output voltage is adjusted, such that the AC output power is maintained at the predetermined power.

11. The control method of claim 9, wherein the step of generating a capacitance adjustment signal for adjusting an impedance of a variable capacitor circuit, such that the resonant transmitter circuit substantially operates in an impedance matched condition, includes: generating the capacitance adjustment signal according to the operation signal and/or the coil current, for adjusting the impedance of the variable capacitor circuit, such that the coil current is maintained at a first local minimum.

12. The control method of claim 9, wherein the step of generating a capacitance adjustment signal for adjusting an impedance of a variable capacitor circuit, such that the resonant transmitter circuit substantially operates in an impedance matched condition, includes: generating the capacitance adjustment signal according to the AC output current, for adjusting the impedance of the variable capacitor circuit, such that the AC output current is maintained at a second local minimum.

13. The control method of claim 9, wherein the step of generating a capacitance adjustment signal for adjusting an impedance of a variable capacitor circuit, such that the resonant transmitter circuit substantially operates in an impedance matched condition, includes: generating the capacitance adjustment signal according to a capacitor voltage of the capacitor in the LC circuit, for adjusting the impedance of the variable capacitor circuit, such that the capacitor voltage is maintained at a third local minimum.

14. The control method of claim 10, further comprising: adjusting an operation frequency and/or a duty ratio of the operation signal, such that when the AC output power is lower than the predetermined power, the coil current is maintained at the predetermined constant coil current, and when the AC output power is not lower than the predetermined power, the AC output power is maintained at the predetermined power.

* * * * *